United States Patent
Hinkle

(10) Patent No.: US 12,493,873 B2
(45) Date of Patent: Dec. 9, 2025

(54) SELF-CHECKOUT SECURITY VIOLATION VALIDATION CONTROL

(71) Applicant: Toshiba Global Commerce Solutions, Inc., Durham, NC (US)

(72) Inventor: Johanna Hinkle, South Bend, IN (US)

(73) Assignee: Toshiba Global Commerce Solutions, Inc., Durham, NC (US)

(*) Notice: Subject to any disclaimer, the term of this patent is extended or adjusted under 35 U.S.C. 154(b) by 293 days.

(21) Appl. No.: 17/986,978

(22) Filed: Nov. 15, 2022

(65) Prior Publication Data
US 2024/0161094 A1     May 16, 2024

(51) Int. Cl.
G06Q 20/38         (2012.01)
G06Q 20/18         (2012.01)

(52) U.S. Cl.
CPC .......... *G06Q 20/382* (2013.01); *G06Q 20/18* (2013.01)

(58) Field of Classification Search
CPC ...... G06Q 20/382; G06Q 20/18; G06Q 20/20; G06Q 20/206; G07G 1/0036; G07G 1/0045; G07G 1/0054; G07G 1/0072; G07G 3/003
See application file for complete search history.

(56) References Cited

U.S. PATENT DOCUMENTS

| 7,044,370 B2 | 5/2006 | Bellis |
| 9,564,031 B2 | 2/2017 | Migdal |
| 2012/0197741 A1* | 8/2012 | Carlegren ............ G07G 1/0036 705/16 |

OTHER PUBLICATIONS

Design Against Crime Research Centre, Self-Checkout Loss: Increasing Participation and Scan Accuracy Through Design, Sep. 2020, University of the Arts London, Central Saint Martins, available at https://www.ecrloss.com/research/self-checkout-loss-increasing-participation-and-scanaccuracy-through-design.

* cited by examiner

*Primary Examiner* — A. Hunter Wilder
(74) *Attorney, Agent, or Firm* — Kaufman & Canoles P.C.

(57) ABSTRACT

Systems and methods of controlling self-checkout security validation are presented. In one exemplary embodiment, a method is performed by a first network node operably coupled over a network to a second network node having a sensing device operable to sense self-checkout information associated with self-checkout of an item by the second network node. Further, the second network node is operable to determine that the self-checkout information corresponds to a security violation during the self-checkout of that item and to selectively send an indication to request a validation of the security violation. The method comprises receiving, by the first network node, a validation resolution information indication associated with a resolution of the requested validation of the security violation so as to adaptively control, based on the validation resolution information, a condition by which the second network node determines to send the validation request indication associated with the security violation.

17 Claims, 10 Drawing Sheets

400a

```
BY A FIRST NETWORK NODE OPERABLY COUPLED OVER A NETWORK TO A SECOND OR THIRD
NETWORK NODE HAVING A SENSING DEVICE OPERABLE TO SENSE SELF-CHECKOUT
INFORMATION ASSOCIATED WITH SELF-CHECKOUT OF AN ITEM BY THE SECOND NETWORK
NODE, WITH THE SECOND NETWORK NODE BEING OPERABLE TO DETERMINE THAT THE SELF-
CHECKOUT INFORMATION OF THAT ITEM CORRESPONDS TO A SECURITY VIOLATION AND TO      ⎯ 401a
SELECTIVELY SEND AN INDICATION TO REQUEST A VALIDATION OF THE SECURITY VIOLATION,
RECEIVE, FROM THE SECOND OR THIRD NETWORK NODE OVER THE NETWORK, A VALIDATION
RESOLUTION INFO INDICATION ASSOCIATED WITH A RESOLUTION OF THE REQUESTED
VALIDATION OF THE SECURITY VIOLATION SO AS TO ADAPTIVELY CONTROL, BASED ON THE
VALIDATION RESOLUTION INFORMATION, A CONDITION BY WHICH THE SECOND NETWORK
NODE DETERMINES TO SEND THE VALIDATION REQUEST INDICATION ASSOCIATED WITH THE
                              SECURITY VIOLATION
                                       ↓
DETERMINE, BASED ON THE VALIDATION RESOLUTION INFORMATION, A METRIC ASSOCIATED    ⎯ 403a
     WITH THE SELF-CHECKOUT OF THE ITEM BY THE SECOND NETWORK NODE THAT
    CORRESPONDS TO THE SECURITY VIOLATION FOR WHICH THE VALIDATION REQUEST
                              INDICATION WAS SENT
                                       ↓                                         ⎯ 405a
 ADAPTIVELY CONTROL THE CONDITION BY WHICH THE SECOND NETWORK NODE DETERMINES
  TO SEND THE VALIDATION REQUEST INDICATION ASSOCIATED WITH THE SECURITY VIOLATION
                BASED ON THE VALIDATION RESOLUTION INFORMATION OR THE METRIC     ⎯ 407a
      ADAPT THE CONDITION ASSOCIATED WITH THE SECURITY VIOLATION BASED ON THE
                VALIDATION RESOLUTION INFORMATION OR THE METRIC                  ⎯ 409a

ADAPT A THRESHOLD ASSOCIATED WITH A LIKELIHOOD OR A RATE THAT THE SELF-
         CHECKOUT NODE SENDS THE INDICATION TO REQUEST THE VALIDATION OF THE
         SECURITY VIOLATION BASED ON THE SELF-CHECKOUT INFORMATION OR THE METRIC,
                    WHEREIN THE CONDITION INCLUDES THE THRESHOLD

↓                                         ⎯ 411a
 SEND, BY THE FIRST NETWORK NODE OVER THE NETWORK, TO THE SECOND NETWORK NODE,
          AN INDICATION OF THE CONDITION ASSOCIATED WITH THE SECURITY VIOLATION
```

FIG. 4A

SELF-CHECKOUT SECURITY VIOLATION VALIDATION CONTROL

BACKGROUND

A self-checkout (SCO) or self-service checkout system, are machines that provide a mechanism for customers to complete their own transaction from a retailer without needing a traditional staff-supported checkout. A frictionless checkout system includes various technologies and processes to make retail shopping faster and easier for consumers. Further, frictionless checkouts ease and speed the buying process in an effort to make shopping transactions faster, simpler, less stressful and more enjoyable to consumers.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 4A illustrates one embodiment of a method performed by the first network node of adaptively controlling validation of a security violation associated with self-checkout of an item in accordance with various aspects as described herein.

DETAILED DESCRIPTION

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Self-checkout systems provide mechanisms for identifying security violations and determining whether to notify retail staff to investigate such violations. However, self-checkout systems do not consider both improving a frictionless shopping experience while also preventing shrink at self-checkout. The term shrink is a retail industry term that refers to losses suffered by retailers such as from customer theft and errors incurred as part of the process of retailing (e.g., self-checkout). Additionally, these systems do not define how to configure security settings associated with self-checkout systems to balance the likelihood or frequency of security violations and the frictionless shopping experience. Security violations and corresponding validations, shopper interventions and retail shopper assistance are important data points to understand as part of the retail process. However, the logic for when to interrupt the shopper during self-checkout may involve variables unrelated to security. One of the benefits of using variables unrelated to security for configuring the self-checkout experience is to make the self-checkout system appear to have an inconsistent or unpredictable behavior. Such behavior can deter shoppers from attempting to abuse the self-checkout system. Accordingly, improvements described herein include adaptively controlling conditions by which self-checkout systems determine to send validation request indications associated with security violations during self-checkout of items by self-checkout systems.

Figure 1:
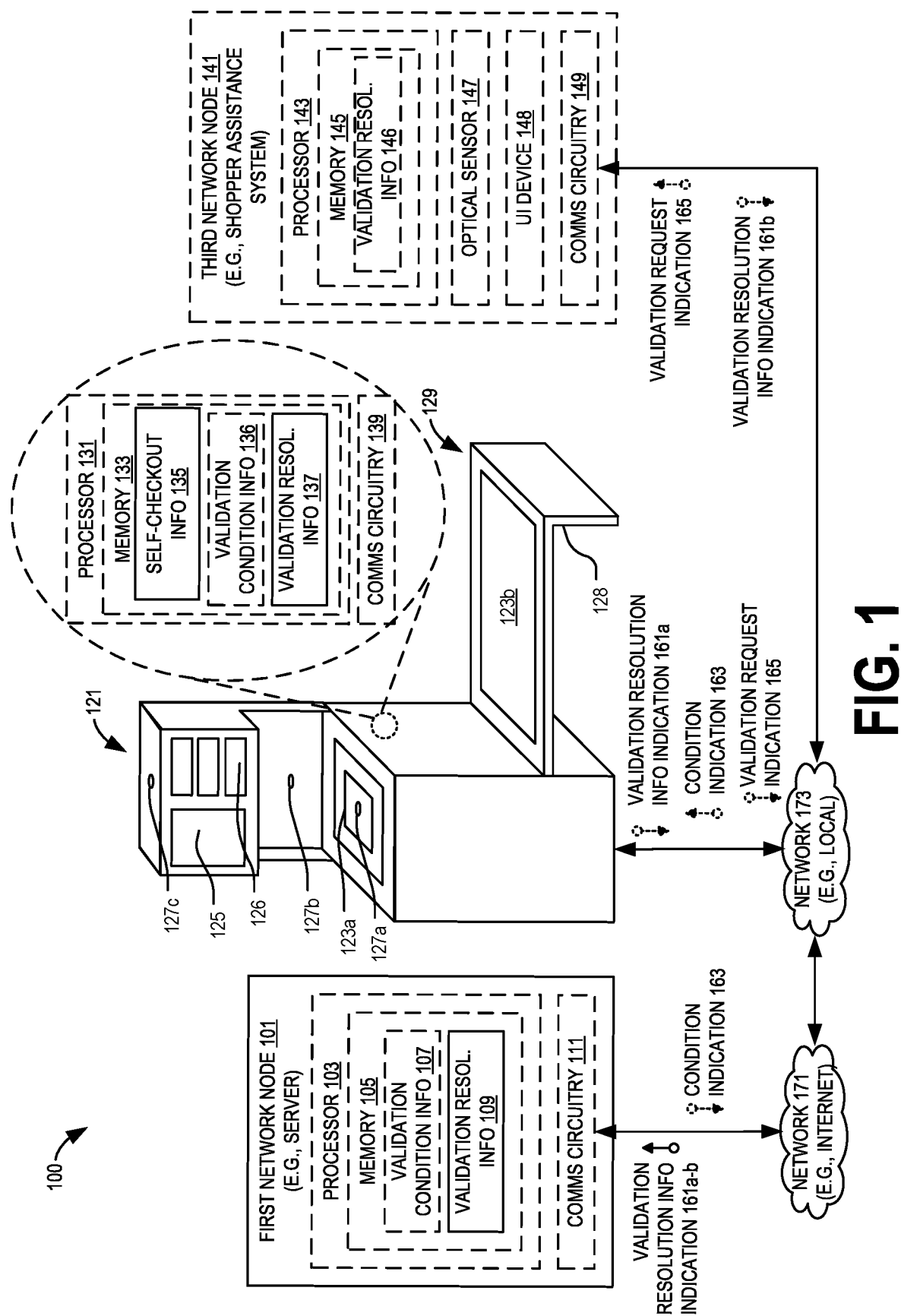
FIG. 1 illustrates one embodiment of a system of adaptively controlling validation of a security violation associated with self-checkout of an item in accordance with various aspects as described herein.

Furthermore, the exemplary embodiments described herein include improved techniques to enable a first network node (e.g., server) to utilize information associated with self-checkout of an item by a second network node (e.g., self-checkout system) to adaptively control a condition by which the second network node determines to send a validation request indication associated with a security violation such as for display at the second network node or to a third network node. For example, FIG. 1 illustrates one embodiment of a system 100 of controlling validation of a security violation associated with self-checkout of an item in accordance with various aspect as described herein. In FIG. 1, the system 100 includes a first network node 101 (e.g., server), a second network node 121 (e.g., self-checkout system), and a third network node 141 (e.g., shopper assistance system). The first network node 101 can be communicatively coupled over network 171 (e.g., wide area network) to the network 173 (e.g., local area network). The networks 171 and 173 can be the same network or different networks. The second and third network nodes 121, 141 can be communicatively coupled over network 173 (e.g., USB, 120, Bluetooth, WiFi, Ethernet). Further, the first network node 101 can be communicatively coupled to multiple instances of the second or third network nodes 121, 141 over the networks 171, 173. In addition, the third network node 141 can be communicatively coupled to multiple instances of the second network node 121 over the network 173.

In FIG. 1, the network nodes 101, 121, 141 can include processing circuitry 103, 131, 143 that is operably coupled to memory 105, 133, 145 and network communications circuitry 111, 139, 149, the like, or any combination thereof. The network communication circuitry 111, 139, 149 is configured to transmit and/or receive information to and/or from other network nodes over the network 171, 173 via any communication technology. The processing circuitry 103, 131, 143 is configured to perform processing described herein, such as by executing instructions stored in the memory 105, 133, 145. The second network node 121 can include one or more sensing devices such as one or more optical devices 127*a-c* (e.g., camera, bar code scanner), first and second weight scales 123*a-b*, the like, or any combination thereof. The second network node 121 can also include a user interface device 125, 126 (e.g., touchscreen display, LED, keypad, payment reader), a bagger device 128 having a bagging area 129 with the second weight scale 123*b*, or the like. The first weight scale 123*a* is operable to measure a weight of an item (e.g., produce) placed on the surface of the scale 123*a*. The first weight scale 143*a* can include an integrated optical device 127*a* (e.g., scanner scale) that is operable to scan a bar code positioned on an item that is moved over the window surface of the scale 123*a*. The second weight scale 123*b* is operable to measure a weight or a difference in weight of items placed in the bagging area 129. The optical device 127*b* can be configured with a viewing angle towards the surface of the first scale 123*a* and operable to capture one or more images of an item positioned on the scale 123*a*. Additionally or alternatively, the optical device 127*b* can be configured to have a viewing angle towards the bagging area 129 and is operable to capture one or more images of any items positioned in the bagging area 129. The optical device 127*c* is operable to capture one or more images of the environment associated with the second network node 121. In one example, the optical device 127*c* is configured with a viewing angle towards an area within the retail store where shoppers can wait in line to use the second network node 121 and is operable to capture one or more images of that area.

The third network node 141 can also include an optical sensor 147 and a user interface device 148. The optical sensor 147 is operable to capture one or more images of the environment associated with the second network node 121. In one example, the optical device 147 is configured with a viewing angle towards an area within the retail store where shoppers can wait in line to use the second network node 121 and is operable to capture one or more images of that area. The user interface device 148 can be configured to display a validation request indication associated with the self-checkout of an item by the second network node 121. The user interface device 148 can include a speaker, a sound card, a video card, a display (e.g., touchscreen), a monitor, a printer, an actuator, an emitter (e.g., LED), a smartcard, the like, or any combination thereof. In one example, the third network node 141 receives, from the second network node 121, a validation request indication associated with the self-checkout of an item by the second network node 121. In response, the processor 151 of the third network node 141 sends, for display on the user interface device 148 (e.g., presence-sensitive display), an indication of that validation request.

The memory 105 of the first network node 101 can be configured to include validation condition information 107, validation resolution information 109, or the like. The memory 133 of the second network node 121 can be configured to include self-checkout information 135, validation condition information 136, validation resolution information 137, or the like. The memory 145 of the third network node 141 can be configured to include validation resolution information 146. The self-checkout information 135 can include information associated with self-checkout of an item. Further, the self-checkout information 135 can include an attribute or characteristic associated with an item (e.g., weight, color, dimension, shape, price, quantity, item description, transactional information, bar code, ingredients). the self-checkout information 135 can also include information associated with a security violation.

A security violation can be associated with any information obtained by the one or more sensing devices during the self-checkout of an item by the second network node 121 that could reasonably be expected to be an inappropriate self-checkout of that item. In one example, a security violation is associated with a weight of an item, as measured by a first sensing device 123*a* while positioned on the surface of the first sensing device 123*a*, that is determined to be outside a certain weight tolerance of that item (e.g., invalid item weight). In another example, a security violation is associated with a weight difference of the bagging area 129, as measured by the second sensing device 123*b* when an item is placed in the bagging area 129, that is determined to be outside a certain weight tolerance of that item (e.g., invalid item weight). In another example, a security violation is associated with a weight of the bagging area 129 as measured by the second sensing device 123*b* being above a certain maximum weight or weight difference threshold for those items that have been scanned by the first optical sensor 127*a* and expected to be placed in the bagging area 129 (e.g., extra item placed in the bagging area 149). In yet another example, a security violation is associated with a weight or weight difference of the bagging area 129 as measured by the second sensing device 123*b* being below a certain minimum weight threshold associated with a weight or weight difference of those items that have been scanned by the first optical sensor 127*a* and expected to be placed in the bagging area (e.g., item skipped bagging).

The validation resolution information 109, 137, 146 can include information associated with a validation, a shopper intervention or a shopper assistance, all of which are associated with a security violation during the self-checkout of an item by the second network node 121. Further, the validation resolution information 109, 137, 146 can be associated with one or more actions related to the resolution of a security violation such as voiding an item from a transaction, selecting another item, adding another item to a transaction, resetting the measured weight by the second sensing device 123*b* of an item placed in the bagging area 129 (e.g., zeroing the weight scale), or the like. The first or second network node 121, 141 is operable to obtain validation resolution information associated with any actions to resolve a security violation. In addition, the validation resolution information 109, 137, 146 can include self-checkout information associated with the security violation.

In operation, the second network node 121 may obtain self-checkout information (e.g., item weight, bagging area weight) associated with the self-checkout of an item (e.g., retail item) by the second network node 121. The second network node 121 may determine that there is a security violation (e.g., invalid weight of the item, extra weight in the bagging area, bagging was skipped) based on the self-checkout information associated with that item. In response, the second network node 121 may obtain or may determine the validation resolution information (e.g., invalid item voided from transaction, new item added to transaction, measured weight of bagging area zeroed, invalid item replaced, new item added) related to the resolution of the security violation. Further, the second network node 121 sends, to the first network node 101, an indication 161*a* of the validation resolution information related to the security violation.

The first network node 101 receives the validation resolution information indication 161*a* and may determine metric information associated with the self-checkout of the item by the second network node 121 that correspond to the security violation for which the validation request indication was sent. The first network node 101 then adaptively controls the condition (e.g., likelihood or rate threshold) by which the second network node 121 determines to send the validation request indication associated with the security violation based on the validation resolution information or the metric information. The first network node 101 can adaptively control the condition by adapting the condition based on the validation resolution information or the metric to obtain an adapted condition associated with the security violation. In one example, the first network node 101 adapts a threshold associated with a likelihood or rate that the second network node 121 sends a validation request indication 165 associated with the security violation associated based on the validation resolution information or the metric.

When the likelihood or rate of security violations for items that require a security validation is above a certain first threshold, then the first network node 101 can increase or decrease that threshold by a certain threshold offset. In one example, the certain threshold offset can range from one percent (1%) to five percent (5%) of items having a security violation that require a security validation. When the likelihood or rate of security violations for items that require a security validation is below a certain second threshold, then the first network node 101 can increase or decrease that threshold by a certain threshold offset. In one example, the certain threshold offset can range from one percent (1%) to five percent (5%) of items having a security violation that require a security validation. The first and second thresholds can the same threshold or different thresholds. Further, the first and second thresholds can be determined so as to reduce hysteresis.

In FIG. 1, the first network node 101 can send, to the second network node 121, an indication 163 associated with the condition of the security violation. The second network node 121 can then receive the condition indication 163. The second network node 121 can determine to send the validation request indication 165 of the security violation based on the condition. In response, the second network node 121 sends, to the third network node 141 (e.g., shopper assistance system) over the network 173, the validation request indication 165 of the security violation. The third network node 121 receives the validation request indication 165 and obtains the validation request. The third network node 121 then determines to output, for display on the user interface device 129 (e.g., display, LED), a second indication of the validation request associated with the security violation. A store clerk may then respond to the second indication by conducting a validation, a shopper intervention or a shopper assistance resolution associated with the security violation at the second or third network node 121, 141. The second or third network node 121, 141 may receive, from a user interface device (e.g., touchscreen, display, keyboard, mouse), a validation resolution information indication associated with the resolution of the validation, the shopper intervention or the shopper assistance. The second or third network node 121, 141 can send, to the first network node 101 over the network 171, 173, the validation resolution indication 161*a-b* associated with the security violation.

In some embodiments, the first network node 101 can receive security configuration information from another network node. The first network node 101 can control the condition (e.g., likelihood or rate threshold) by which the second network node 121 determines to send the indication to request the validation of the security violation based on the security configuration information, self-checkout information or the metric information. The first network node 101 can determine the condition such as a likelihood threshold that a security violation associated with an items requires a security validation.

In some embodiments, the security configuration information can be associated with a targeted security validation rate such as for deterring criminal behavior while using the second network node 121.

In some embodiments, the first network node 101 uses the security configuration information to determine a threshold associated with a likelihood that any violations related to self-checkout of items by the second network node 121 over a certain time period require validation. Further, the first network node 101 can adapt this threshold to increase or decrease an average time required for self-checkout.

In some embodiments, the first network node 101 determines, based on the self-checkout information, a metric associated with a rate of security violations for those self-checkout items that require security validations over a certain time period (e.g., a timestamp range).

In some embodiments, the first network node 101 determines a metric associated with a rate of security violations for those self-checkout items that resulted in no validation over a certain time period (i.e., inaction rate metric). The first network node 101 can control the condition by adapting the condition based on the inaction rate metric to obtain an adapted condition associated with the security violation. In one example, the first network node 101 adapts a threshold associated with a rate that the second network node 121 determines to send a validation request indication of the security violation associated with the self-checkout of an item by the second network node 121 based on the inaction rate metric. When the average likelihood or rate of security violations for items that require a security validation is above or below a certain threshold, then the network node 121 can increase or decrease that threshold by a certain threshold offset. In one example, the certain threshold offset can range from one percent (1%) to five percent (5%) of items having a security violation that require a security validation.

In some embodiments, the first network node 101 receives an indication associated with one or more images captured by the optical sensor 127*b-c* of the second network node 121 or the optical sensor 147 of the third network node 141. The viewing angle of each optical sensor 127*b-c*, 147 can be towards an area within the retail store where shoppers can wait in line to use the second network node 121. The first network node 101 can receive and in response, send the one or more images to perform object detection by a neural network or a machine learning circuit to detect certain objects (e.g., people, faces, bodies, etc.) in the one or more images associated with the area where people are standing in line waiting for the second network node 141. Prior to sending the one or more images, the second or third network node 121, 141 can anonymize the one or more images to remove any personally identifiable information such as by distorting or blurring the faces of any persons displayed in the image. A skilled artisan will readily recognize techniques for anonymizing personally identifiable information associated with one or more people displayed in an image. The first network node 101 can determine the number of persons waiting in line to access the second network node 121 based on the anonymized image(s). Further, the first network node can then adapt the condition by which the second network node determines to send the validation request indication associated with the security violation based on the number of persons waiting in the line. For example, as the number of persons waiting in line to use the second network node 121 increases or decreases as determined from the anonymized image(s), the first network node 101 can adapt the condition to increase or decrease the likelihood of a security violation. In another example, as the number of persons waiting in line to use the second network node 121 increases or decreases as determined from the anonymized image(s), the first network node 101 can adapt the condition to decrease or increase the rate of a security violation.

In some embodiments, the first network node 101 compares an inaction rate associated with the security violations to an inaction rate threshold. In response, the first network node 101 adapts the condition by which the second network node 121 determines to send the validation request indication associated with the security violation. For example, the first network node 101 determines that 30% of validation require no action (i.e., a 30% inaction rate). In this example, because the inaction rate exceeds an inaction rate threshold (e.g., 20%), the first network node 101 adapts this condition of the second network node 121.

Figure 2A:
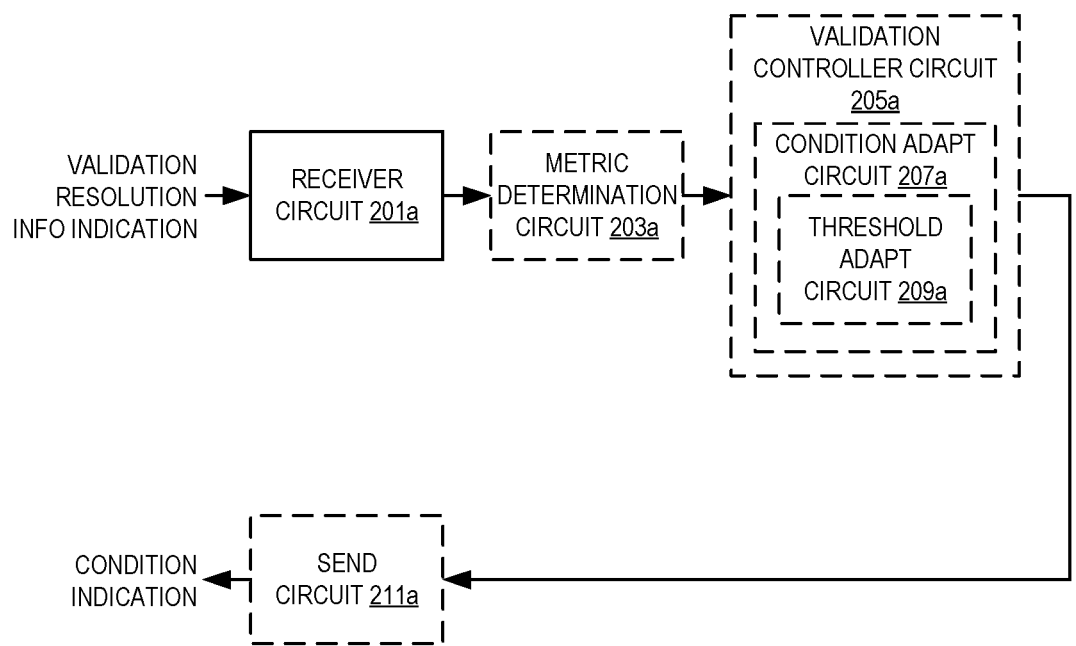
FIG. 2A illustrates one embodiment of the first network node (e.g., server) of FIG. 1 in accordance with various aspects as described herein.

FIG. 2A illustrates one embodiment of a first network node device 200*a* in accordance with various aspects as described herein. In FIG. 2A, the device 200*a* implements various functional means, units, or modules (e.g., via the processing circuitry 301*a* in FIG. 3A, via the processing circuitry 501 in FIG. 5, via software code, or the like), or circuits. In one embodiment, these functional means, units, modules, or circuits (e.g., for implementing the method(s) described herein) may include for instance: a receiver circuit 201*a* operable to receive a validation resolution indication associated with resolution of a requested validation of a security violation; a metric determination circuit 203*a* operable to determine, based on the validation resolution information, a metric associated with the self-checkout of items by the self-checkout system that corresponds to the security violation for which a validation request indication was sent; a validation controller circuit 205*a* operable to adaptively control the condition by which a second network node determines to send the validation request indication to request the validation of the security violation based on the self-checkout information or the metric; a validation condition adapt circuit 207*a* operable to adapt the condition associated with the security violation based on the validation resolution information or the metric of the security violation; a threshold adapt circuit 209*a* operable to adapt a threshold associated with a likelihood or a rate that the second network node sends the validation request indication of the security violation based on the validation resolution information or the metric; and a send circuit 211*a* operable to send a condition indication associated with the security violation.

Figure 2B:
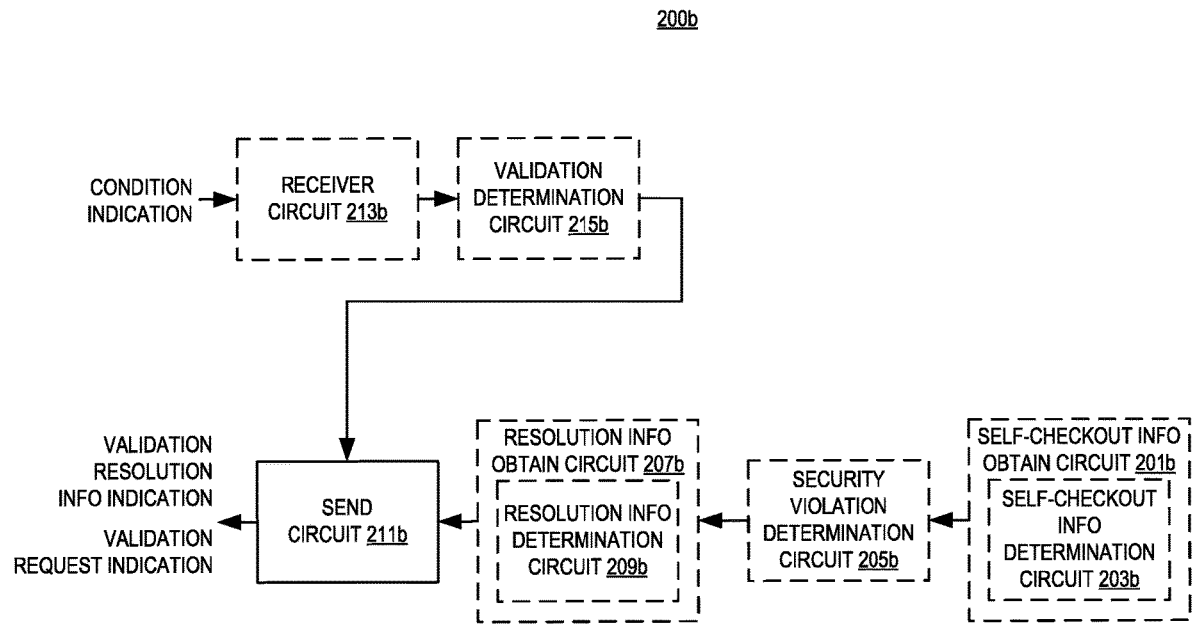
FIG. 2B illustrates one embodiment of the second network node (e.g., self-checkout system) of FIG. 1 in accordance with various aspects as described herein.

FIG. 2B illustrates one embodiment of a second network node device 200*b* in accordance with various aspects as described herein. In FIG. 2B, the device 200*b* implements various functional means, units, or modules (e.g., via the processing circuitry 301*c* in FIG. 3C, via the processing circuitry 501 in FIG. 5, via software code, or the like), or circuits. In one embodiment, these functional means, units, modules, or circuits (e.g., for implementing the method(s) herein) may include for instance: a self-checkout information obtain circuit 201*b* operable to obtain self-checkout information of an item during self-checkout of that item by the second network node device 200*b*; a self-checkout information determination circuit 203*b* operable to determine the self-checkout information of the item during the self-checkout of that item by the second network node; a security violation determination circuit 205*b* operable to determine a security violation based on the self-checkout information of the item; a validation resolution information obtain circuit 207*b* operable to obtain validation resolution information associated with a resolution of the requested validation of the security violation; a validation resolution information determination circuit 209*b* operable to determine the validation resolution information associated with the resolution; a send circuit 211*b* operable to send, to a first network node over a network, an indication of the validation resolution information related to the security violation and to send a validation request indication associated with the security violation; a receiver circuit 213*b* operable to receive, from the first network node over the network, an indication associated with a condition by which the second network node determines to send the validation request indication of the security violation; and a validation determination circuit 215*b* operable to determine to send the validation request indication associated with the security violation based on the condition.

Figure 2C:
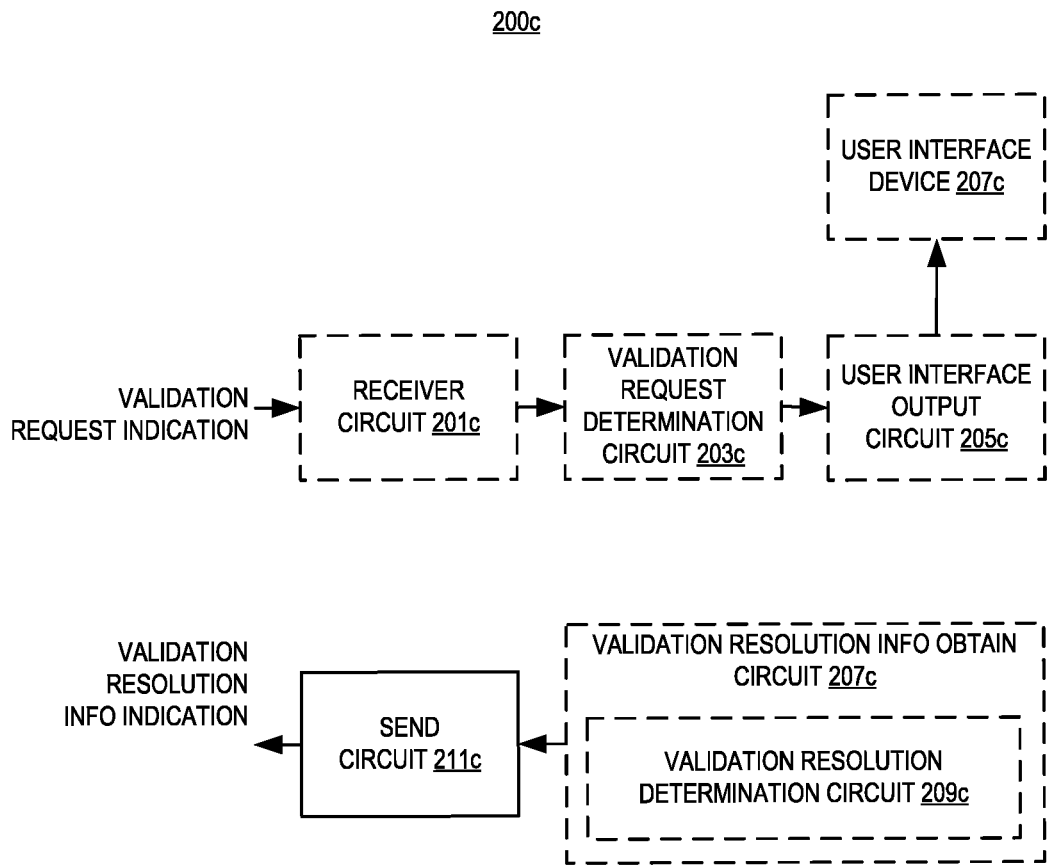
FIG. 2C illustrates one embodiment of the third network node (e.g., shopper assistance system) of FIG. 1 in accordance with various aspects as described herein.

FIG. 2C illustrates one embodiment of a network node device 200*c* in accordance with various aspects as described herein. In FIG. 2C, the device 200*c* implements various functional means, units, or modules (e.g., via the processing circuitry 301*e* in FIG. 3E, via the processing circuitry 501 in FIG. 5, via software code, or the like), or circuits. In one embodiment, these functional means, units, modules, or circuits (e.g., for implementing the method(s) herein) may include for instance: a receiver circuit 201*c* operable to receive a first indication to request validation of a security violation; a validation request determination circuit 203*c* operable to determine to request the validation of the security violation based on the first indication; a user interface output circuit 205*b* operable to output, for display on a user interface device 207*c* (e.g., touchscreen display, LED), a second indication associated with the validation request of the security violation responsive to receiving the first indication; a validation resolution information obtaining circuit 209*b* operable to obtain validation resolution information associated with a resolution of the requested validation of the security violation; a validation resolution determination circuit 211*b* operable to determine the validation resolution information associated with the resolution of the requested validation of the security violation; a send circuit 213*b* operable to send, to the first network node over the network, a third indication of the validation resolution information related to the security violation.

Figure 3A:
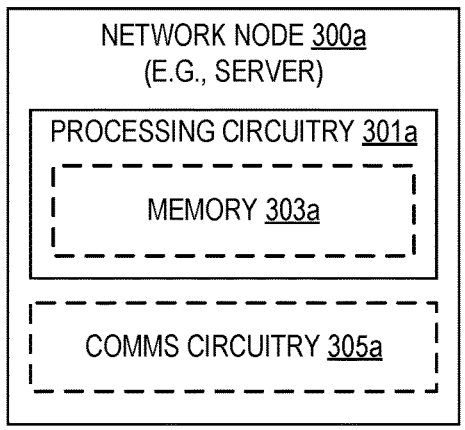
FIGS. 3A-B illustrate other embodiments of the first network node in accordance with various aspects as described herein.
Figure 3B:
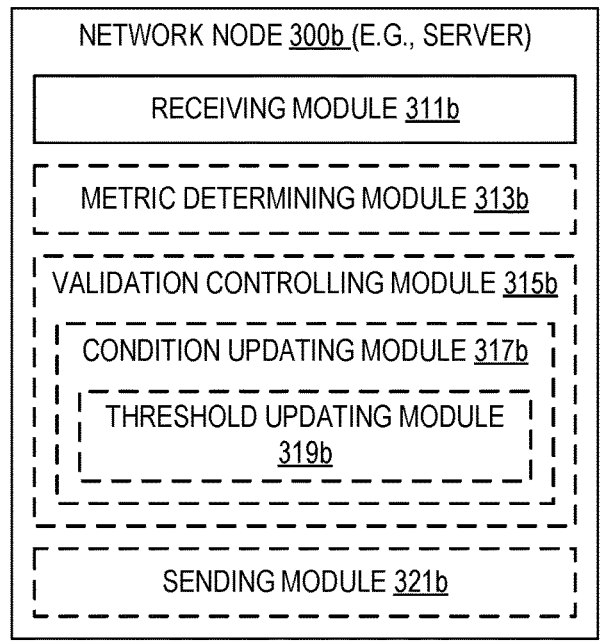

FIGS. 3A-B illustrate other embodiments of a first network node device 300*a-b* in accordance with various aspects as described herein. In FIG. 3A, the device 300*a* may include processing circuitry 301*a* that is operably coupled to one or more of the following: memory 303*a* and network communications circuitry 305*a*, the like, or any combination thereof. The network communication circuitry 305*a* is configured to transmit and/or receive information to and/or from one or more other network node devices via any communication technology. The processing circuitry 301*a* is configured to perform processing described herein, such as by executing instructions stored in memory 303*a*. The processing circuitry 301*a* in this regard may implement certain functional means, units, or modules.

Figure 5:
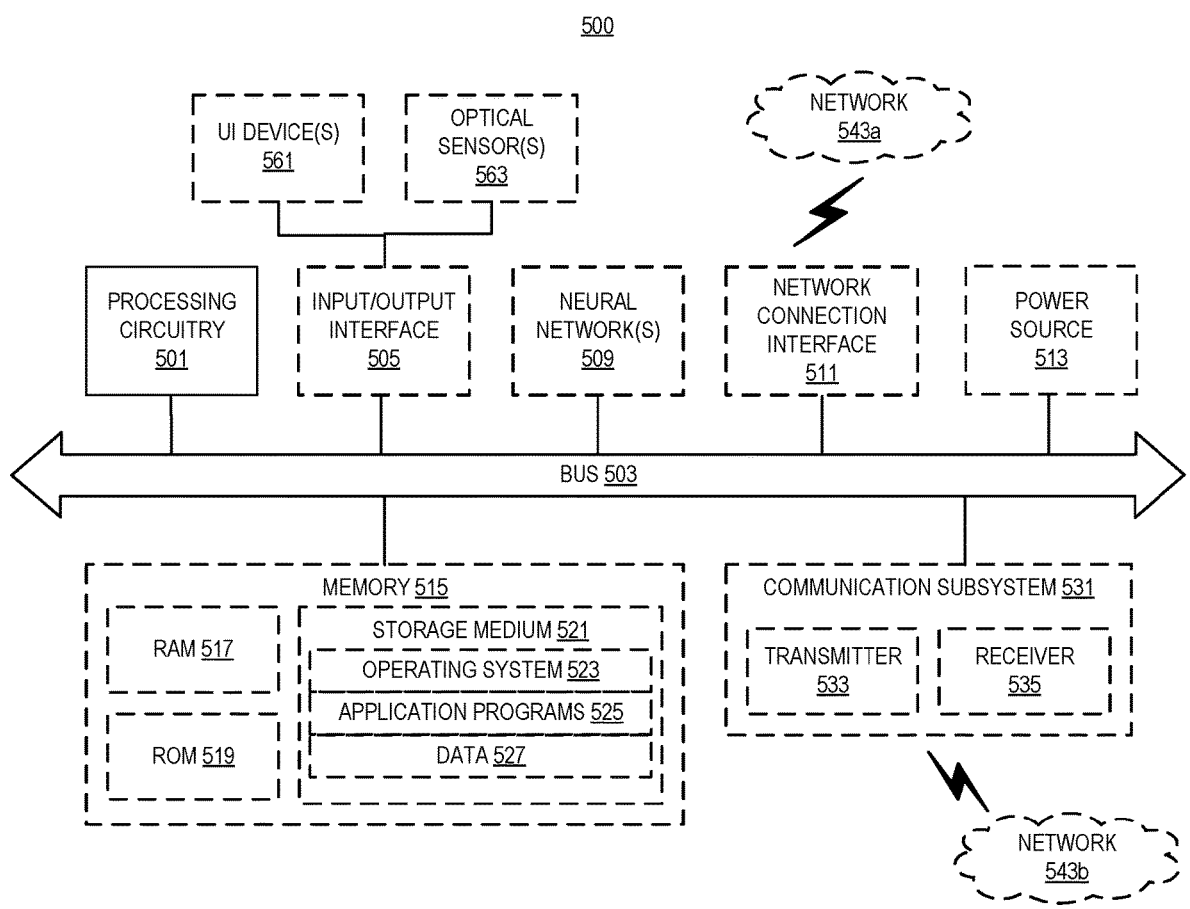
FIG. 5 illustrates other embodiments of a network node in accordance with various aspects as described herein.

In FIG. 3B, the device 300*b* implements various functional means, units, or modules (e.g., via the processing circuitry 301*a* in FIG. 3A, via the processing circuitry 501 in FIG. 5, via software code, or the like). In one embodiment, these functional means, units, or modules (e.g., for implementing the method(s) described herein) may include for instance: a receiving module 311*b* for receiving, from a second node over a network, an indication of validation resolution information related to a security violation; a metric determining module 313*b* for determining, based on the validation resolution information, a metric associated with the self-checkout of items by the self-checkout system that corresponds to the security violation for which a validation request indication was sent; a validation controlling module 315*b* for adaptively controlling a condition by which the second network node determines to send a validation request indication associated with the security violation based on the validation resolution information or the metric; a condition updating module 317*b* for adapting the condition associated with the security violation based on the validation resolution information or the metric; a threshold updating module 319*b* for adapting a threshold associated with a likelihood or a rate that the second network node sends an indication to request the validation of the security violation based on the validation resolution information or the metric; and a sending module 321*b* for sending, to the second network node over the network, an indication of the condition associated with the security violation.

Figure 3D:
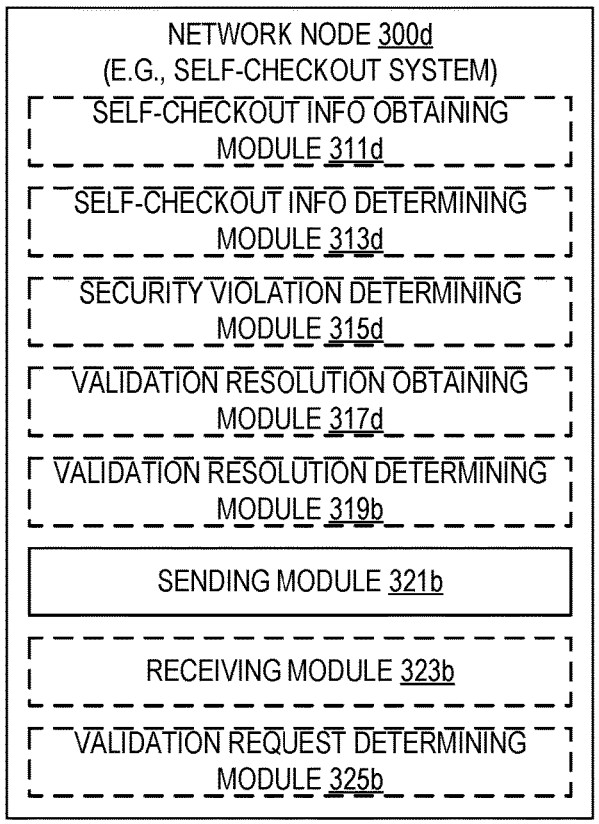
FIGS. 3C-D illustrate other embodiments of the second network node in accordance with various aspects as described herein.
Figure 3C:
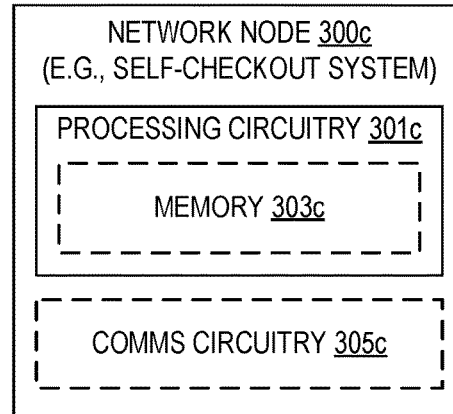

FIGS. 3C-D illustrate other embodiments of a second network node device 300*c-d* in accordance with various aspects as described herein. In FIG. 3C, the device 300*c* may include processing circuitry 301*c* that is operably coupled to one or more of the following: memory 303*c* and network communications circuitry 305*c*, the like, or any combination thereof. The network communication circuitry 305*c* is configured to transmit and/or receive information to and/or from one or more other network node devices via any communication technology. The processing circuitry 301*c* is configured to perform processing described herein, such as by executing instructions stored in memory 303*c*. The processing circuitry 301*c* in this regard may implement certain functional means, units, or modules.

In FIG. 3D, the device 300*d* implements various functional means, units, or modules (e.g., via the processing circuitry 301*c* in FIG. 3C, via the processing circuitry 501 in FIG. 5, via software code, or the like). In one embodiment, these functional means, units, or modules (e.g., for implementing the method(s) described herein) may include for instance: a self-checkout information obtaining module 311*d* for obtaining self-checkout information of an item during self-checkout of that item by the second network node device 300*d*; a self-checkout information determining module 313*d* for determining the self-checkout information of the item during the self-checkout of that item by the second network node 300*d*; a security violation determining module 315*d* for determining a security violation based on the self-checkout information of the item; a validation resolution obtaining module 317*d* for obtaining validation resolution information associated with a resolution of the requested validation of the security violation; a validation resolution determining module 319*b* for determining the validation resolution information related to the security violation; a sending module 321*b* for sending, to a first network node over a network, an indication of the validation resolution information related to the security violation and for sending a validation request indication associated with the security violation; a receiving module 323*b* for receiving, from the first network node over the network, an indication associated with a condition by which the second network node determines to send the validation request indication of the security violation; and a validation request determining module 325*b* for determining to send the validation request indication associated with the security violation based on the condition.

Figure 3E:
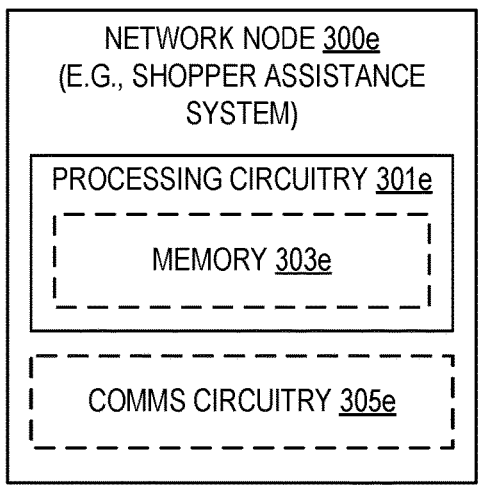
FIGS. 3E-F illustrate other embodiments of the third network node in accordance with various aspects as described herein.
Figure 3F:
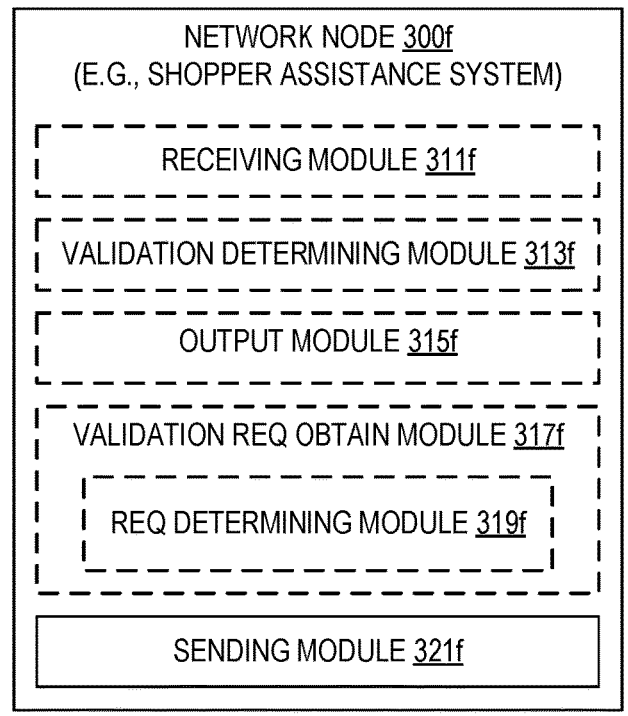

FIGS. 3E-F illustrate other embodiments of a third network node device 300*e-f* in accordance with various aspects as described herein. In FIG. 3E, the device 300*e* may include processing circuitry 301*e* that is operably coupled to one or more of the following: memory 303*e* and network communications circuitry 305*e*, the like, or any combination thereof. The network communication circuitry 305*e* is configured to transmit and/or receive information to and/or from one or more other network node devices via any communication technology. The processing circuitry 301*e* is configured to perform processing described herein, such as by executing instructions stored in memory 303*e*. The processing circuitry 301*e* in this regard may implement certain functional means, units, or modules.

In FIG. 3F, the device 300*f* implements various functional means, units, or modules (e.g., via the processing circuitry 301*e* in FIG. 3E, via the processing circuitry 501 in FIG. 5, via software code, or the like). In one embodiment, these functional means, units, or modules (e.g., for implementing the method(s) described herein) may include for instance: a receiving module 311*f* for receiving, from a second network node over a network, a first indication to request a validation of a security violation; a validation determining module 313*f* for determining to request the validation of the security violation based on the first indication; an output module 315*f* for outputting, for display on a user interface device, a second indication associated with the validation request of the security violation responsive to receiving the first indication; a validation request information obtaining module 317*f* for obtaining validation resolution information associated with a resolution of the requested validation of the security violation; a validation request information determining module 319*f* for determining the validation resolution information associated with the resolution of the requested validation of the security violation; and a sending module 321*f* for sending, to a first network node over the network, a third indication of the validation resolution information related to the security violation.

FIG. 4A illustrates one embodiment of a method 400*a* performed by a first network node of controlling validation of a security violation associated with self-checkout of an item in accordance with various aspects as described herein. In FIG. 4A, the method 400*a* may start, for instance, at block 401*a* where it includes receiving, from a second or third network node over a network, an indication that corresponds to validation resolution information associated with a security violation. At block 403*a*, the method 400*a* can include determining, based on the validation resolution information, a metric associated with the self-checkout of items by the second network node that corresponds to the security violation for which a validation request indication was sent. At block 405*a*, the method 400*a* may include adaptively controlling a condition by which the second network node determines to send the indication to request the validation of the security violation based on the self-checkout information or the metric. At block 407*a*, the step of block 405*a* may further include adapting the condition associated with the security violation based on the validation resolution information or the metric of that security violation. At block 409*a*, the step of block 407*a* may further include adapting a threshold associated with a likelihood or a rate that the second network node sends the validation request indication associated with the security violation based on the self-checkout information or the metric. At block 411*a*, the method 400a may include sending, to the second network node, a condition indication associated with the security violation.

Figure 4B:
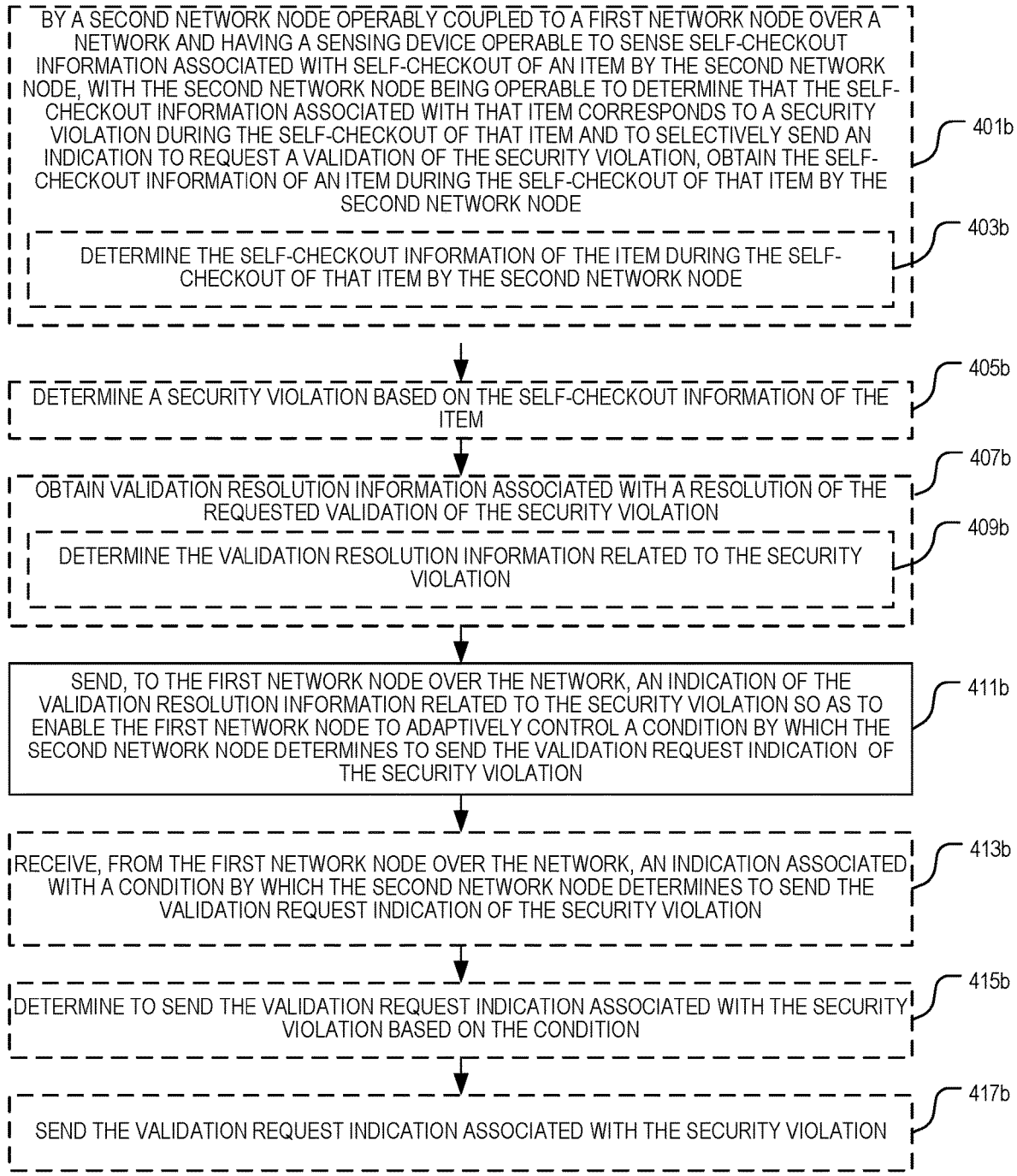
FIG. 4B illustrates one embodiment of a method performed by the second network node of adaptively controlling validation of a security violation associated with self-checkout of an item in accordance with various aspects as described herein.

FIG. 4B illustrates one embodiment of a method 400b performed by a second network node of controlling validation of a security violation associated with self-checkout of an item in accordance with various aspects as described herein. In FIG. 4B, the method 400b may start, for instance, at block 401b where it may include obtaining self-checkout information of an item during self-checkout of that item by the second network node. At block 403b, the method 400b may include determining the self-checkout information of the item during the self-checkout of that item by the second network node. At block 405b, the method 400b may include determining a security violation based on the self-checkout information of the item. At block 407b, the method 400b may include obtaining validation resolution information related to a resolution of the security violation. At block 409b, the method 400b may include determining the validation resolution information related to the resolution of the security violation. At block 411b, the method 400b includes sending, to a first network node over a network, an indication of the validation resolution information related to the security violation. At block 413b, the method 400b may include receiving, from the first network node over the network, an indication associated with a condition by which the second network node determines to send the validation request indication of the security violation. At block 415b, the method 400b may include determining to send a validation request indication associated with the security violation based on the condition. At block 417b, the method 400b may include sending the validation request indication associated with the security violation.

Figure 4C:
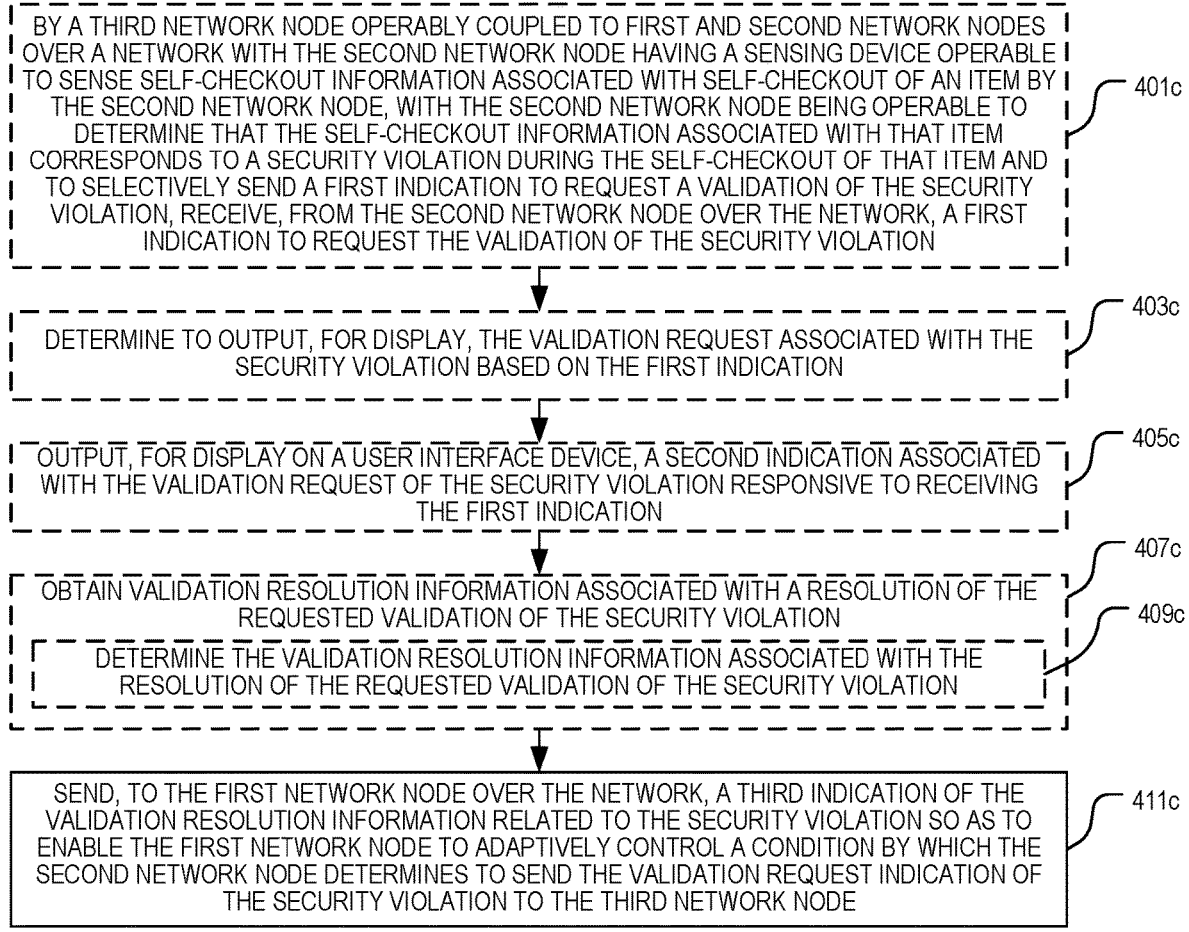
FIG. 4C illustrates one embodiment of a method performed by the third network node of adaptively controlling validation of a security violation associated with self-checkout of an item in accordance with various aspects as described herein.

FIG. 4C illustrates one embodiment of a method 400c performed by a third network node of adaptively controlling validation of a security violation associated with self-checkout of an item in accordance with various aspects as described herein. In FIG. 4C, the method 400c may start, for instance, at block 401c where it may include receiving, from a second network node over a network, a first indication to request validation of a security violation associated with self-checkout of an item by the second network node. In response to receiving the first indication, the method 400c may determine to output for display a second indication associated with the validation request of the security violation, as represented by block 403c. At block 405c, the method 400c may output, to a user interface device (e.g., display, LED), the second indication. At block 407c, the method 400c may obtain validation resolution information associated with a resolution of the requested validation of the security violation. At block 409c, the method 400c may determine the validation resolution information associated with the resolution of the requested validation of the security violation. At block 411c, the method 400c sends, to a first network node over the network, an indication of the validation resolution information related to the security violation so as to enable the first network node to adaptively control a condition by which the second network node determines to send the validation request indication of the security violation to the third network node.

FIG. 5 illustrates another embodiment of a network node device 500 in accordance with various aspects as described herein. In FIG. 5, device 500 includes processing circuitry 501 that is operatively coupled to input/output interface 505, neural network circuit 509, network connection interface 511, memory 515 including random access memory (RAM) 517, read-only memory (ROM) 519, and storage medium 521 or the like, communication subsystem 531, power source 533, and/or any other component, or any combination thereof.

The input/output interface 505 may be configured to provide a communication interface to an input device, output device, or input and output device. The device 500 may be configured to use an output device 561 via input/output interface 505. An output device 561 may use the same type of interface port as an input device. For example, a USB port may be used to provide input to and output from the device 500. The output device 561 may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor 563, (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, resolution data 529, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection of certain objects in an image. In one example, a first neural network circuit is configured to perform object detection of persons in an image. For example, the neural network circuit 509 may use image data to detect the number of people in a self-checkout queue. In FIG. 5, the network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500a-b to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500a-b.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a new method can be added to a checkout environment for consumers (CHEC) system to analyze security errors, interventions, and shopper assistant resolution data to suggest configuration changes and make automatic adjustments to meet high level security goals. A CHEC system includes a configuration option to define which percentage of items scanned require security validation. The CHEC system adds new configurations and logic to make the automatic adjustments based on store transaction data. For instance, when the percentage of security violations for items requiring security validation exceeds a first threshold, then increase the percentage of items requiring security validation by a configurable increment. When the percentage of security violations for items requiring security validation falls below a second threshold, decrease the percentage of items requiring security validation by a configurable increment. When a security related intervention occurs, analyze the following contributing factors: (i) invalid weight (e.g., did the shopper assistant correct an invalid item by voiding and adding another?); (ii) extra weight in bagging area (e.g., did the shopper assistant add a new item to the transaction? Did the shopper assistant zero the bagging area?); (iii) skip bagging (e.g., did the shopper assistant correct an invalid item by voiding and adding another?); (iv) or the like. Further, if a certain percentage of these errors did not result in any shopper assistant actions, then provide reporting or automatic configuration adjustments to decrease security points for these security events or to increase weight tolerances for the self-checkout system.

In one exemplary embodiment, a method performed by a first network node operably coupled over a network to a second network node having a sensing device operable to sense self-checkout information associated self-checkout of an item by the second network node. Further, the second network node is operable to determine that the self-checkout information of that item corresponds to one or more security violations and to selectively send an indication to request a validation of at least one security violation. The method includes receiving, from the second network node over the network, an indication of validation resolution information associated with a resolution of the requested validation of the security violation so as to adaptively control, based on the validation resolution information, a condition by which the second network node determines to send the validation request indication associated with the security violation.

In another exemplary embodiment, the method further includes controlling, based on the validation resolution information related to the security violation, the condition by which the second network node determines to send the validation request indication of the security violation.

In another exemplary embodiment, the method further includes determining, based on the validation resolution information related to the security violation, metric information associated with the self-checkout of items by the second network node that corresponds to the security violation for which the violation request indication was sent. Further, the controlling step is further based on the metric information of the security violation.

In another exemplary embodiment, the controlling step further includes adapting the condition associated with the security violation based on the metric information of that security violation to obtain an adapted condition associated with that security violation.

In another exemplary embodiment, the method further includes sending, by the first network node over the network, to the second network node, an indication of the adapted condition associated with the security violation. Further, the second network node is further operable to selectively send the validation request indication of the security violation based on the adapted condition.

In another exemplary embodiment, the adapting step further includes determining a threshold associated with a likelihood or a rate that the second network node sends the validation request indication of the security violation based on the metric information. Further, the adapted condition includes the threshold for the security violation.

In another exemplary embodiment, the threshold determining step further includes adapting the threshold based on the metric information of the security violation.

In another exemplary embodiment, the method further includes adaptively controlling, based on self-checkout information related to a first security violation, a first condition by which the second network node determines to send a validation request indication of the first security violation related to the self-checkout of an item by the second network node. In addition, the method further includes adaptively controlling, based on self-checkout information related to a second security violation, a second condition by which the second network node determines to send a validation request indication of the second security violation related to the self-checkout of the same item.

In another exemplary embodiment, the validation resolution information includes information associated with a proportion of the self-checkout of items by the second network node that resulted in the security violation for which the validation request indication was sent.

In one exemplary embodiment, a first network node is operably coupled over a network to a second network node having a sensing device operable to sense self-checkout information associated with self-checkout of an item by the second network node. Further, the second network node is operable to determine that the self-checkout information of that item corresponds to one or more security violations. In addition, the second network node is operable to selectively send an indication to request a validation of at least one security violation. The network node includes a processor and a memory, with the memory containing instructions executable by the processor whereby the processor is configured to receive an indication of validation resolution information associated with a resolution of the requested validation of the security violation so as to adaptively control, based on the validation resolution information associated with the security violation, a condition by which the second network node determines to send the validation request indication associated with the security violation.

In one exemplary embodiment, a method is performed by a second network node operably coupled to a first network node over a network and having a sensing device operable to sense self-checkout information associated with self-checkout of an item by the second network node. Further, the second network node is operable to determine that the self-checkout information of that item corresponds to one or more security violations during the self-checkout of that item and to selectively send an indication to request a validation of at least one security violation. The method includes sending, to the first network node over the network, an indication of validation resolution information associated with a resolution of the requested validation of the security violation so as to enable the network node to adaptively control, based on validation resolution information, a condition by which the second network node sends the validation request indication associated with the security violation.

In another exemplary embodiment, the method further includes obtaining the self-checkout information during the self-checkout of that item by the second network node.

In another exemplary embodiment, the method further includes determining that the self-checkout information of that item corresponds to at least one security violation.

In another exemplary embodiment, the method further includes receiving, by the second network node over the network, from the first network node, an indication associated with the condition for which the second network node sends the validation request indication of the security violation.

In another exemplary embodiment, the method further includes determining to send the validation request indication of the security violation based on the condition.

In another exemplary embodiment, the method further includes sending the validation request indication associated with the security violation based on the condition.

In another exemplary embodiment, the method includes receiving, by the second network node over the network, from the first network node, threshold information associated with a likelihood or a rate that the second network node sends the validation request indication associated with the security violation. In response to determining to send that validation request indication based on the threshold information, the method further includes sending that validation request indication.

In another exemplary embodiment, the method further includes determining information associated with a proportion of the self-checkout of items by the second network node that resulted in the security violation for which the validation request indication was sent. Further, the validation resolution information for that security violation includes the proportion information.

In another exemplary embodiment, a security violation is associated with a weight of an item measured by the sensing device that is determined to be outside a certain weight tolerance of that item.

In one exemplary embodiment, a second network node is operably coupled over a network to a network node and has a sensing device operable to sense self-checkout information associated with self-checkout of an item by the second network node. Further, the second network node is operable to determine that the self-checkout information of that item corresponds to one or more security violations and to selectively send an indication to request a validation of at least one security violation. In addition, the second network node further includes a processor and a memory, with the memory containing instructions executable by the processor whereby the processor is configured to send, to the first network node over the network, an indication of validation resolution information associated with a resolution of the requested validation of the security violation so as to enable the network node to adaptively control, based on the validation resolution information, a condition by which the second network node determines to send the validation request indication associated with the security violation.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
   by a first network node having a processing circuitry and a memory and operably coupled over a network to a second network node, the second network node having a processing circuitry operably coupled to a sensing device, the second network node being operable to:
     sense, via the sensing device, self-checkout information associated with self-checkout of an item at the second network node,
     detect that the self-checkout information of that item satisfies one or more predefined violation criteria corresponding to a security violation, and
     send, to the first network node over the network, an indication to request a validation of the security violation,
   receiving, by the first network node and in response to the security violation, from the second network node over the network, an indication that includes a validation resolution information associated with a resolution of the requested validation of the security violation detected during a self-checkout transaction by the second network node;
   executing, by the first network node, one or more instructions stored in the memory to process the validation resolution information and to compute a violation outcome metric, the violation outcome metric being associated with a rate or likelihood that validation requests corresponding to security violations resulted in a shopper intervention;
   computing, by the first network node, based on the violation outcome metric, a control condition having one or more real-time operational thresholds that define a triggering condition for issuing future validation requests at the second network node;
   sending, by the first network node, to the second network node over the network, an indication that includes the control condition associated with the security violation; and
   enabling the second network node to determine, during a subsequent self-checkout transaction, to send a validation request based on the currently sensed self-checkout information and the control condition associated with the security violation.

2. The method of claim 1, further comprising:
   obtaining, based on the validation resolution information, metric information associated with the self-checkout of items by the second network node that correspond to the security violation for which the validation request indication was sent.

3. The method of claim 1, wherein the controlling step further includes:
   adapting the condition associated with the security violation based on the validation resolution information.

4. The method of claim 3, wherein the adapting step further includes:
   adapting a threshold associated with a likelihood or a rate in which the second network node sends the validation request indication associated with the security violation based on the validation resolution information, wherein the condition includes the adapted threshold for that security violation.

5. The method of claim 4, wherein the threshold adapting step further includes:
   adapting the threshold by a certain threshold offset based on the validation resolution information.

6. The method of claim 1, further comprising:
   adaptively controlling, based on self-checkout information related to a first security violation, a first condition by which the second network node determines to send a validation request indication associated with the first security violation related to the self-checkout of an item by the second network node; and
   adaptively controlling, based on self-checkout information related to a second security violation, a second condition by which the second network node determines to send a validation request indication associated with a second security violation related to the self-checkout of the same item, wherein the first and second conditions are different.

7. The method of claim 1, wherein the condition represents a threshold associated with a likelihood or rate in which the second network node determines to send the validation request indication associated with the security violation.

8. A first network node, comprising:
   with the first network node being operably coupled over a network to a second network node, the second network node having a processing circuitry operably coupled to a sensing device, the second network node being operable to:
     sense, via the sensing device, self-checkout information associated with self-checkout of an item at the second network node;
     detect that the self-checkout information of that item satisfies one or more predefined violation criteria corresponding to a security violation; and
     send, to the first network node over the network, an indication to request a validation of the security violation; and
   wherein the first network node further comprises a processing circuitry and a memory, the memory containing instructions executable by the processing circuitry whereby the processing circuitry is configured to:
   receive, in response to the security violation, from the second network node over the network, an indication that includes a validation resolution information associated with a resolution of the requested validation of the security violation detected during a self-checkout transaction by the second network node;

process the validation resolution information and compute a violation outcome metric, the violation outcome metric being associated with a rate or likelihood that validation requests corresponding to security violations resulted in a shopper intervention;

compute, based on the violation outcome metric, a control condition having one or more real-time operational thresholds that define a triggering condition for issuing future validation requests at the second network node;

send, to the second network node over the network, an indication that includes the control condition associated with the security violation; and enable the second network node to determine, during a subsequent self-checkout transaction, to send a validation request based on the currently sensed self-checkout information and the control condition associated with the security violation.

9. A method, comprising:

by a second network node operably coupled to a first network node over a network and having a processing circuitry operably coupled to a memory and a sensing device, sensing, via the sensing device, self-checkout information associated with self-checkout of an item at the second network node;

detecting that the self-checkout information of that item satisfies one or more predefined violation criteria corresponding to a security violation;

sending, to the first network node over the network, an indication to request a validation of the security violation;

sending, to the first network node over the network, an indication that includes a validation resolution information associated with a resolution of the requested validation of the security violation;

receiving, from the first network node over the network, an indication that includes a control condition computed by the first network node based on the validation resolution information, the control condition including one or more real-time operational thresholds associated with the security violation; and executing the control condition during a subsequent self-checkout transaction to determine, based on currently sensed self-checkout information and the received control condition, to send a validation request indication associated with the security violation; and sending, to the first network node over the network, the validation request indication associated with the security violation during the subsequent self-checkout transaction.

10. The method of claim 9, further comprising:

obtaining the self-checkout information of the item during the self-checkout of that item by the second network node.

11. The method of claim 9, further comprising:

determining that the self-checkout information of the item corresponds to the security violation.

12. The method of claim 9, further comprising:

determining to send the validation request indication associated with the security violation based on the condition.

13. The method of claim 12, further comprising:

sending the validation request indication associated with the security violation based on the condition.

14. The method of claim 9, further comprising:

receiving, by the second network node over the network, from the first network node, the condition indication that includes a threshold associated with a likelihood or rate that the second network node sends the corresponding validation request indication associated with the security violation during a subsequent self-checkout transaction; and in response to determining to send the validation request indication associated with the security violation based on the threshold, sending that validation request indication.

15. The method of claim 9, further comprising:

obtaining, based on the validation resolution information, metric information associated with the self-checkout of items by the second network node that correspond to the security violation for which the validation request indication was sent, wherein the validation resolution information associated with the security violation includes the metric information.

16. The method of claim 15, wherein the condition represents a threshold associated with a likelihood or rate in which the second network node determines to send the validation request indication associated with the security violation.

17. A second network node, comprising:

with the second network node being operably coupled to a first network node over a network and having a processing circuitry operably coupled to a memory and a sensing device; and wherein the memory contains instructions executable by the processing circuitry whereby the processing circuitry is configured to:

sense, via the sensing device, self-checkout information associated with self-checkout of an item at the second network node;

detect that the self-checkout information of that item satisfies one or more predefined violation criteria corresponding to a security violation;

sending, to the first network node over the network, an indication to request a validation of the security violation;

send, to the first network node over the network, an indication that includes a validation resolution information associated with a resolution of the requested validation of the security violation;

receive, from the first network node over the network, an indication that includes a control condition computed by the first network node based on the validation resolution information, the control condition including one or more real-time operational thresholds associated with the security violation;

execute the control condition during a subsequent self-checkout transaction to determine, based on currently sensed self-checkout information and the received control condition, to send a validation request indication associated with the security violation; and send, to the first network node over the network, the validation request indication associated with the security violation during the subsequent self-checkout transaction.

* * * * *